United States Patent [19]
Shiragaki

[11] Patent Number: 5,663,820
[45] Date of Patent: Sep. 2, 1997

[54] OPTICAL NETWORK USING MULTIPLEXED PAYLOAD AND OAM SIGNALS

[75] Inventor: Tatsuya Shiragaki, Tokyo, Japan

[73] Assignee: NEC Corporation, Tokyo, Japan

[21] Appl. No.: 579,676

[22] Filed: Dec. 28, 1995

[30] Foreign Application Priority Data

Dec. 28, 1994 [JP] Japan .................. 6-341126

[51] Int. Cl.$^6$ .............. H04J 14/02; H04J 14/08
[52] U.S. Cl. ............ 359/128; 359/125; 359/118; 359/137; 359/139; 370/360
[58] Field of Search ................ 370/115, 110, 370/117, 118, 123, 125, 128, 137, 139, 352, 360, 522

[56] References Cited

U.S. PATENT DOCUMENTS

5,303,078  4/1994  Brackett et al. ................. 359/123

Primary Examiner—Kinfe-Michael Negash
Attorney, Agent, or Firm—Sughrue, Mion, Zinn, Macpeak & Seas

[57] ABSTRACT

In a first node of an optical network, an OAM (operations, administration and maintenance) controller produces an electrical OAM signal to control an optical cross-connect switch. This OAM signal is converted to an optical OAM signal and optically multiplexed with an optical payload signal associated with an optical path established in the cross-connect switch, producing an optical multiplex signal which is transmitted. A second node of the network demultiplexes the transmitted signal into an optical payload signal and an optical OAM signal, the latter being converted to an electrical OAM signal and used by an OAM controller of the second node for updating the OAM information. The updated OAM information is used to control the optical cross-connect switch of the second node. The demultiplexed optical payload signal is associated with an optical path established in the cross-connect switch of the second node.

12 Claims, 7 Drawing Sheets

OPTICAL NETWORK USING MULTIPLEXED PAYLOAD AND OAM SIGNALS

BACKGROUND OF THE INVENTION

1. Field of the Invention

The present invention relates generally to optical communications networks, and more particularly to an optical network where each network node includes an optical cross-connect system and an OAM (operations, administration and maintenance) signal is transmitted to control the cross-connect system of each optical node.

2. Description of the Related Art

Optical switching systems have been developed for purposes of eliminating the need for conversion from optical signals to electrical signals and vice versa at the end points of an optical transmission line. Substantial cost savings can be obtained by the direct optical cross-connect switching because the wide bandwidth of optical fibers would otherwise need a great number of opto-electrical and electro-optical converters. Maintenance of such high-capacity optical transmission systems is therefore an important factor for network providers to ensure reliable service. If a cable failure or a traffic overload occurs in an optical network, direct optical switching allows changeover to occur between very large groups of circuits in a short period of time and allows fast changeback when the situation has been restored to normal. Therefore, the quick recovery feature of the optical cross-connect system is a benefit for the maintenance of an optical network. Additionally, when protection switching occurs, optical cross-connect switching eliminates the need to provide time-division demultiplexing of high-capacity optical signals. The equipment needed for a network node can therefore be kept small.

On the other hand, the standard frame format known as SDH (Synchronous Digital Hierarchy) and SONET (Synchronous Optical NETwork) combines payload and OAM bits in a single frame. Since multiplexing is provided at the level of baseband signals and since a very large number of such frames are time-division multiplexed onto an optical signal, protection switching of optical channels would require time-division demultiplexing of optical signals down to baseband level in order to extract necessary OAM information. This would result in an increased recovery time and increased complexity. One solution would be to provide separate optical transmission lines for exclusively carrying OAM information. However, substantial cost would be needed to implement.

SUMMARY OF THE INVENTION

It is therefore an object of the present invention to provide an optical network capable of economical quick recovery from failures and fast switching of circuits during traffic overloads.

According to the present invention, there is provided an optical network having first and second nodes interconnected by an optical transmission line. The first node comprises an OAM controller for producing an electrical OAM signal, a first optical switch having a plurality of input ports and a plurality of output ports for establishing optical paths therebetween according to the electrical OAM signal, and an electro-optical converter for converting the electrical OAM signal to an optical OAM signal. An optical multiplexer is provided for multiplexing the optical OAM signal with an optical payload signal associated with one of the optical paths established in the first optical switch to produce an optical multiplex signal and transmitting the optical multiplex signal to the second node via the optical transmission line. The second node comprises an optical demultiplexer for demultiplexing the optical multiplex signal into an optical payload signal and an optical OAM signal, an opto-electrical converter for converting the demultiplexed optical OAM signal to an electrical OAM signal, an OAM controller for updating the electrical OAM signal, and a second optical switch having a plurality of input ports and a plurality of output ports for establishing optical paths therebetween according to the updated OAM signal. The optical payload signal demultiplexed by the optical demultiplexer is associated with one of the optical paths established in the second optical switch.

If the second node is an intermediate node, it further includes an electro-optical converter for converting the updated OAM signal to an updated optical OAM signal and an optical multiplexer for multiplexing the updated optical OAM signal with an optical payload signal associated with one of the optical paths established in the optical switch to produce an optical multiplex signal for transmission to a distant node.

For testing the optical paths established in each of the first and second nodes, each of the first and second nodes preferably produces a plurality of optical test signals, and includes a plurality of optical multiplexers for multiplexing the optical test signals respectively with a plurality of optical payload signals to produce a plurality of optical multiplex signals and applying the optical multiplex signals to the input ports of the optical switch of each node, and a plurality of optical demultiplexers for receiving the optical multiplex signals from the output ports of the optical switch of each node and demultiplexing the received optical multiplex signals into a plurality of optical payload signals and a plurality of optical test signals and applying the demultiplexed optical test signals to the OAM controller of each node.

According to a further aspect of the present invention, the OAM controller of the first node produces an internode maintenance signal and an internode operations and administration signal, and the first node further comprises a frame assembler for assembling the internode maintenance signal and the internode OA signal to form an OAM frame and applying the OAM frame to the optical multiplexer as the optical OAM signal, and wherein the second node comprises a frame disassembler for receiving an electrical OAM frame from the opto-electrical converter as the electrical OAM signal and disassembling the received electrical OAM frame into the internode maintenance signal and the internode OA signal and applying the disassembled signals to the OAM controller of the second node.

According to a still further aspect of the present invention, the OAM controller of the first node produces an optical end-to-end OAM signal and an optical internode OAM signal and supplies these signals to the optical multiplexer. The first node further includes a modulator for modulating a subcarrier with the end-to-end OAM signal and a light modulator for modulating an optical payload signal associated with one of the optical paths established in the optical switch of the first node with the modulated subcarrier and applying the modulated optical payload signal to the optical multiplexer as the optical payload signal. As a result, the optical demultiplexer of the second node supplies a subcarrier-modulated optical payload signal and an optical internode OAM signal, and the opto-electrical converter supplies an electrical internode OAM signal to the OAM controller of the second node. The second node further comprises an optical splitter for splitting the subcarrier-modulated optical payload signal of the optical demultiplexer into first and second optical signals and applying the first optical signal to the optical switch of the second node, an opto-electrical converter for converting the second optical signal from the optical splitter to an electrical signal, a bandpass filter for extracting the modulated subcarrier from the electrical signal of the opto-electrical converter, and a demodulator for demodulating the extracted subcarrier to recover the end-to-end OAM signal and supplying the recovered signal to the OAM controller. The OAM controller of the second node controls the optical switch according to the electrical internode OAM signal from the opto-electrical converter and the end-to-end OAM signal from the demodulator.

BRIEF DESCRIPTION OF THE DRAWINGS

The present invention will be described in further detail with reference to the accompanying drawings, in which.

DETAILED DESCRIPTION

Figure 1:
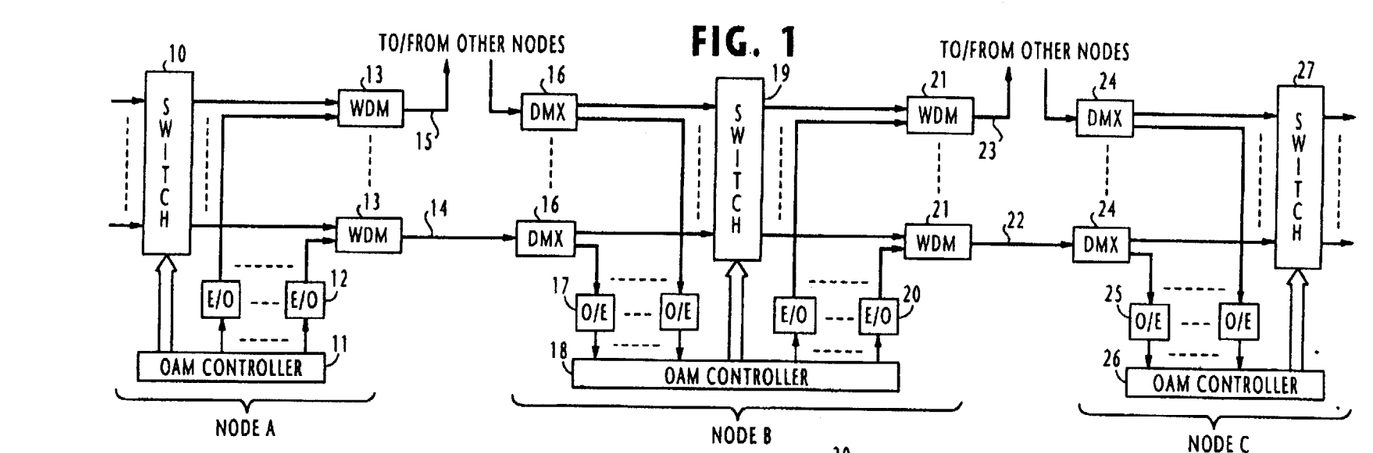
FIG. 1 is a block diagram of an optical network according to a first embodiment of the present invention.

Referring now to FIG. 1, there is shown an optical communications network where a frame format other than the standard digital frame such as SDH (Synchronous Digital Hierarchy) and SONET (Synchronous Optical NETwork) is used for transmitting optical payload signal and OAM (operations, administration and maintenance) signal on separate resources such as optical signals of different wavelengths, optical signals of different polarization plane, and modulation of an optical carrier with baseband and subcarrier frequencies. The network is illustrated as comprising nodes A, B and C connected in tandem as source, intermediate and destination nodes, respectively. For purposes of disclosure, the network of FIG. 1 employs wavelength-division multiplexing for carrying the traffic and OAM signals.

In node A, OAM controller 11 supplies OAM signal associated with outgoing optical transmission lines 14 and 15 to E/O converters 12 where they are converted to optical signals of wavelength 1.55 μm. These optical signals are combined or wavelength-division multiplexed respectively with outgoing traffic of wavelength 1.31 μm supplied from optical switch 10 that is controlled by OAM controller 11.

The wavelength-division multiplexed (WDM) optical signals are transmitted to node B via transmission lines 14 and to other nodes via transmission lines 15.

Node B includes a plurality of wavelength-division demultiplexers 36 for receiving incoming WDM signals from node A as well as from other nodes. The incoming WDM signals are decomposed into 1.31-μm payload signals and 1.55-μm OAM data. The payload signals are supplied to optical switch 19 and the OAM data are converted to electrical signals by O/E converters 17 and applied to OAM controller 18. Using the incoming OAM data, OAM controller 18 controls the optical switch 19 to reconfigure its pattern of optical paths. Additionally, OAM controller 18 updates the incoming OAM data, where necessary, and supplies the updated OAM data to E/O converters 20 for conversion to the wavelength 1.55 μm. The outputs of E/O converters 20 are multiplexed with the outputs of switch 39 by wavelength-division multiplexers 21 and transmitted to node C via transmission lines 22 and to other nodes via transmission lines 23.

Similar operations proceed in node C where the incoming WDM signals are decomposed by wavelength-division demultiplexers 24 into the 1.31-μm components for coupling to switch 27 and the 1.55-μm components for coupling to O/E converters 25. Using the outputs of O/E converters 25, OAM controller 26 controls the switch 27 to reconfigure its connection pattern.

Figure 2:
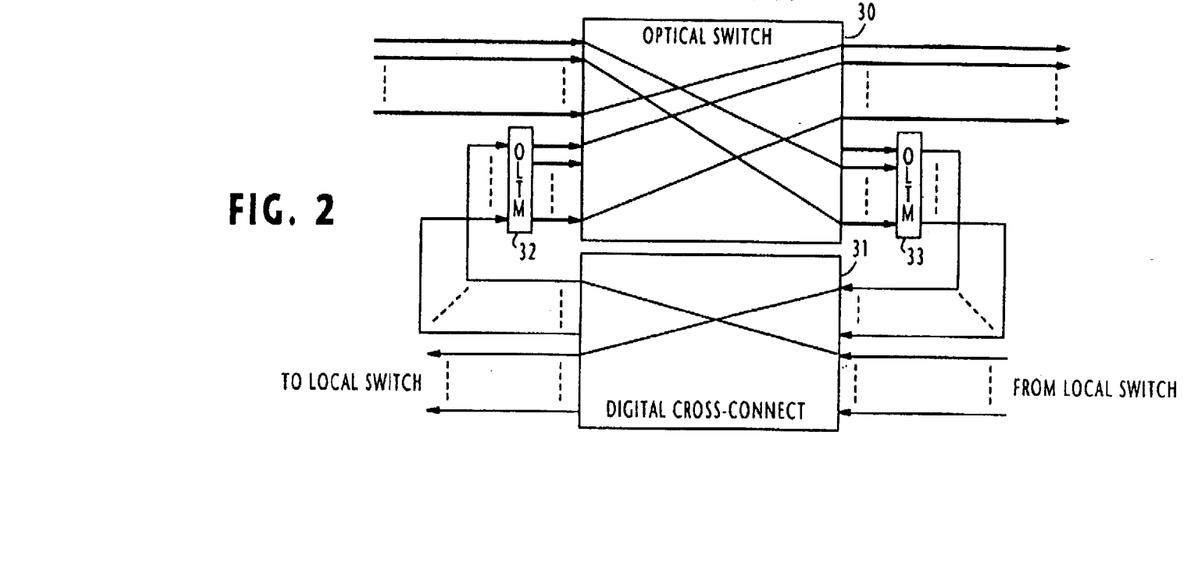
FIG. 2 is an illustration of details of the optical switch used in the present invention.

FIG. 2 shows details of the optical switch used in each node of the optical network of the present invention. Each optical switch comprises an optical switch section 30 of multistage network configuration and a digital cross-connect system 31. The input ports of optical switch section 30 are divided into first and second groups, with the first group receiving optical signals direct from upstream nodes and the second group receiving optical signals from a known optical line terminators and multiplexers unit 32. The output ports of optical switch section 30 are likewise divided into first and second groups, with the first group supplying switched optical signals direct to downstream nodes and the second group supplying switched optical signals to an optical line terminators and multiplexers unit 33. The input ports of digital cross-connect system 31 are divided into first and second groups, with the first group receiving the outputs of OLTM unit 33 and the second group receiving signals from a local switch, not shown. The output ports of digital cross-connect system 31 are also divided into first and second groups, with the first group supplying switched signals to the inputs of OLTM unit 32 and the second group supplying switched signals to the local switch.

Figure 3:
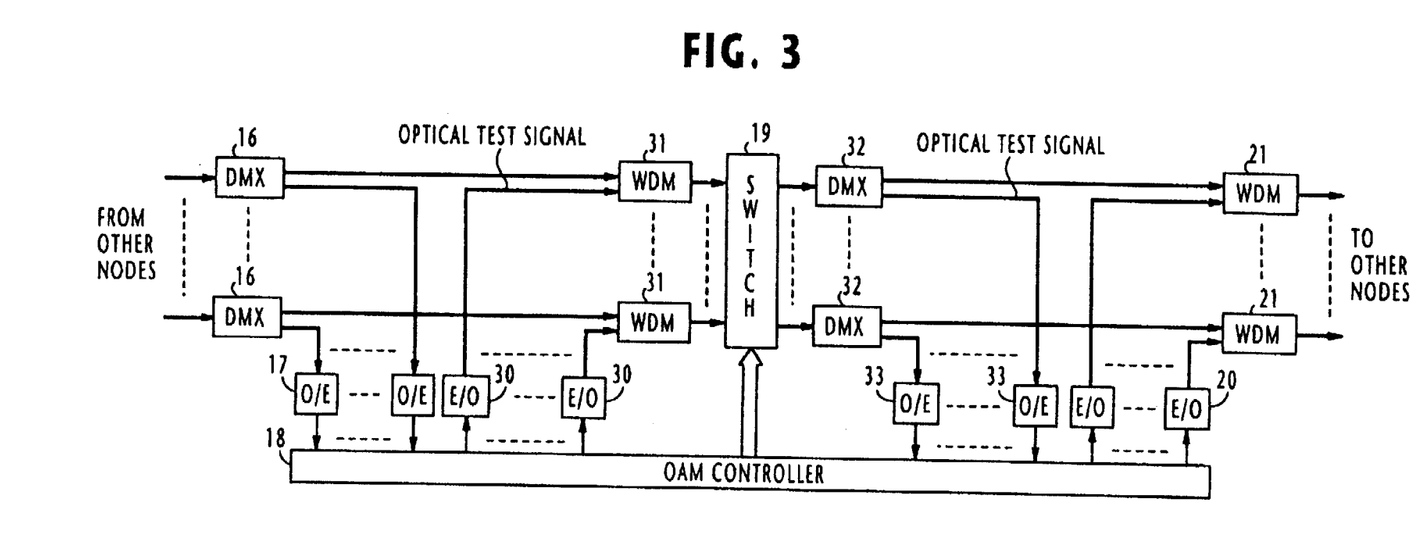
FIG. 3 is a block diagram of an optical network according to a modification of the embodiment of FIG. 1.

The embodiment of FIG. 1 is modified to include a monitoring feature whereby the optical paths of each optical switch of the network of this invention can be monitored for maintenance purposes. This monitoring feature is implemented in node B, for example, by generating a plurality of electrical test signals of a predetermined waveform and supplying them from OAM controller 18 to E/O converters 30 where they are converted to optical signals of wavelength other than the wavelengths of 1.31 μm. The outputs of E/O converters 30 are coupled to wavelength-division multiplexers 31 where they are multiplexed with the 1.31-μm optical outputs of demultiplexers 16. The outputs of multiplexers 31 are coupled through optical switch 19 to wavelength-division demultiplexers 32, where the optical test signals are separated and applied to O/E converters 33 and the optical payload signals are supplied to wavelength-division multiplexers 21. The outputs of O/E converters 33 are analyzed by OAM controller 18 to determine the quality of each of the paths established in the optical switch 19. If there is a trouble in any of the established optical paths, OAM controller 18 will command the switch 19 to reconfigure its connection pattern, updates the OAM signals to be transmitted downstream so as to accommodate the faulty condition of the switch 19 and applies the updated OAM signals to E/O converters 20.

In applications where two neighboring nodes are interconnected by a group of optical transmission lines, the OAM data can also be used to monitor such transmission lines by sequentially selecting one of the transmission lines, transmitting OAM data via the selected line from one node, and synchronizing the other node to the selected line. An embodiment incorporating this feature is shown in FIG. 4, where nodes A and B are the neighboring nodes interconnected by optical transmission lines 67.

Figure 4:
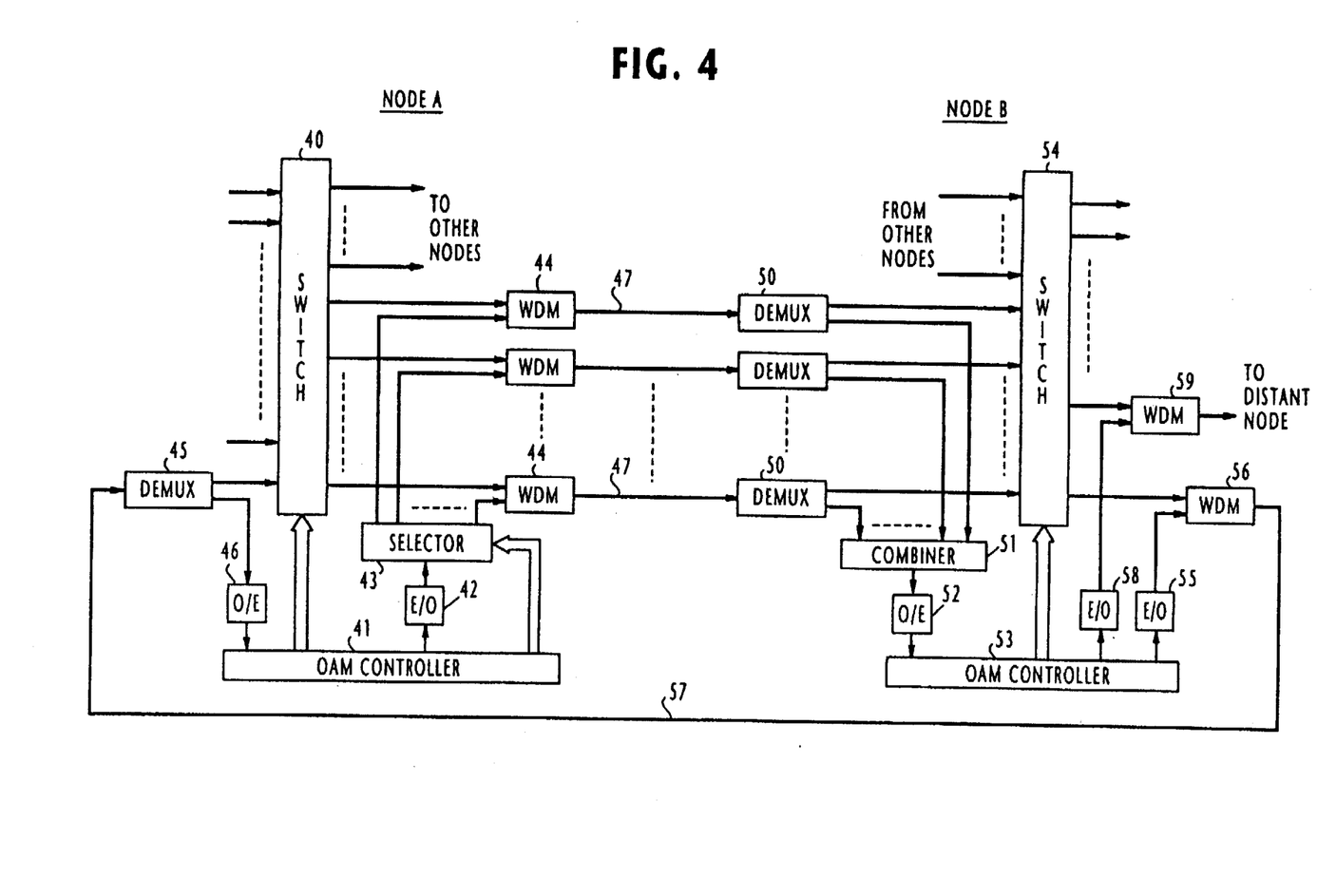
FIG. 4 is a block diagram of an optical network according to a second embodiment of the present invention.

In node A of FIG. 4, OAM controller 41 supplies the OAM signal of a selected transmission line to E/O converter 42 where it is converted to wavelength 1.5 μm and supplied to the input of a selector 43 having a plurality of output terminals connected respectively to wavelength-division multiplexers 44 to which 1.31-μm payload signals are also supplied from optical switch 40. Controller 41 sequentially selects one of the output terminals of selector 43 at 25-ms intervals, for example. The optical OAM signal thus appears at one of the outputs of selector 43 and multiplexed with a payload signal in a corresponding wavelength-division multiplexer 44 and transmitted to node B via transmission lines 47.

The node B of FIG. 4 has a plurality of wavelength-division demultiplexers 50 for receiving incoming WDM signals over transmission lines 47. The multiplexed OAM signals are separated from payload signals by demultiplexers 50 and supplied to an optical combiner 51, the payload signals separated by the multiplexers 50 being supplied to switch 54. The output of optical combiner 51 is converted to electrical signal by O/E converter 52 and fed to OAM controller 53 which controls the switch 54 in accordance with the received OAM information.

If one of the transmission lines 47 should fail, the OAM controller 53 determines the identity of the failed line and commands the switch 54 to reconfigure its connection pattern and supplies an OAM signal to an E/O converter 55 where it is converted to a 1.55-μm optical signal and multiplexed in a multiplexer 56 with a payload signal destined to node A and transmitted via an optical transmission line 57 to node A. Node A includes a wavelength-division demultiplexer 45 where the multiplexed payload signal is separated for coupling to switch 40 and the multiplexed OAM signal is supplied via O/E converter 46 to OAM controller 41. On receiving this OAM signal, OAM controller 41 commands the switch 40 to reconfigure its connection pattern and controls the selector 43 not to select its output that corresponds to the failed transmission line.

If node B is an intermediate node, OAM controller 53 updates the received OAM signal according to the status of the transmission lines 47 and applies it to E/O converter 58 to be multiplexed with a payload signal in a wavelength-division multiplexer 59 for transmission to a distant node.

Figure 5:
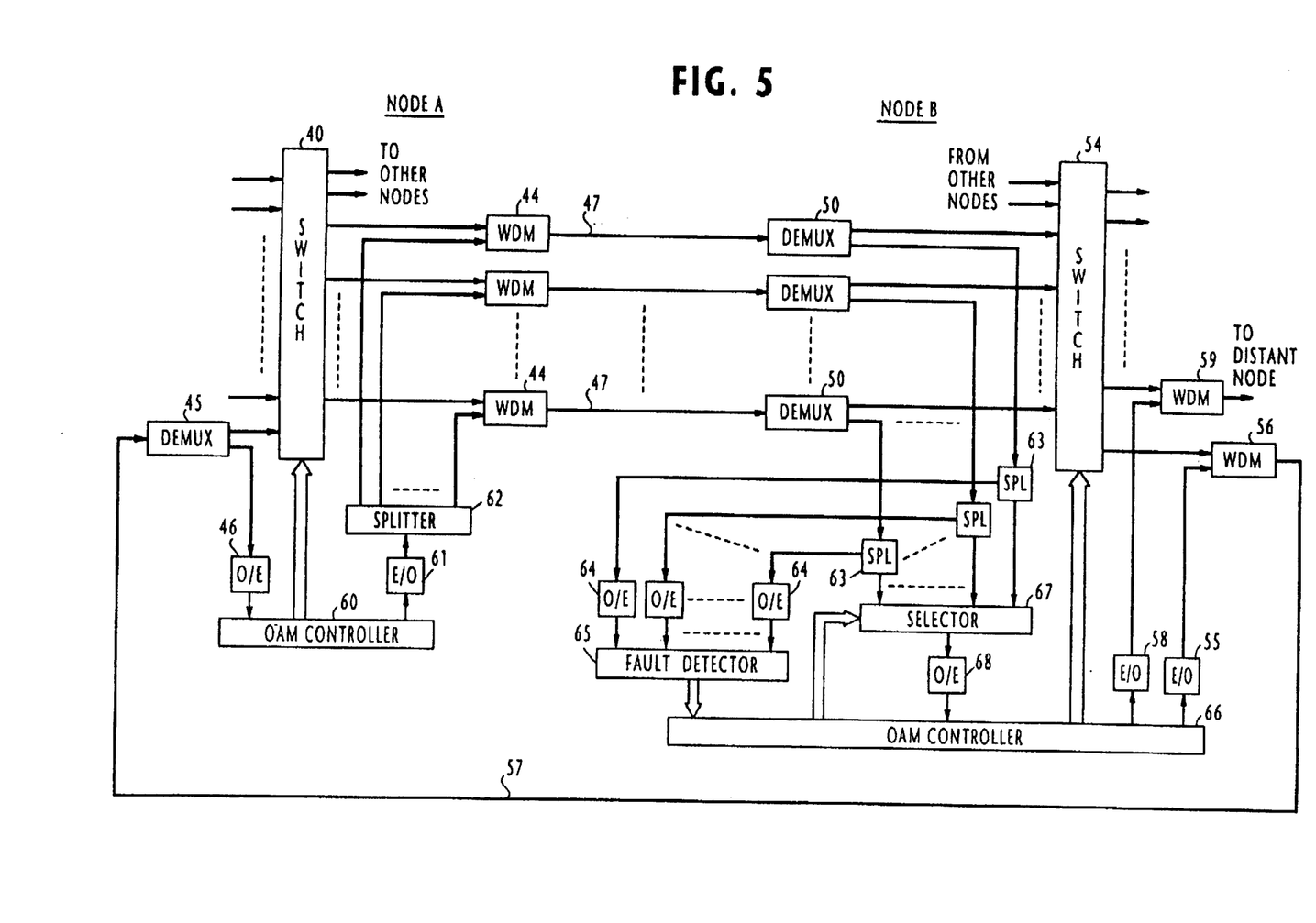
FIG. 5 is a block diagram of an optical network according to a modification of the embodiment of FIG. 4.

A modification of the FIG. 4 embodiment is shown in FIG. 5 in which parts corresponding in significance to those of FIG. 4 are marked with the same numerals as those in FIG. 4. In FIG. 5, node A simultaneously transmits an OAM frame from multiplexers 44 over the group of transmission lines 47 to demultiplexers 50 at node B. At node A, OAM controller 60 supplies an OAM frame through E/O converter 61 to an optical splitter 62 having a plurality of output terminals connected respectively to wavelength-division multiplexers 44, so that optical OAM frames appear simultaneously at the outputs of splitter 62 and multiplexed with optical payload signals in multiplexers 44 and transmitted to node B over transmission lines 47.

Node B of FIG. 5 includes a plurality of optical splitters 63 respectively connected to receive the OAM frames separated by demultiplexers 50. From splitters 63 the OAM frames are supplied to O/E converters 64 as well as to the inputs of an optical selector 67. A fault detector 65 has a plurality of inputs connected respectively to the outputs of O/E converters 64 to constantly monitor the level of OAM frames supplied to its input terminals. In the event of a failure in one of the transmission lines 47, the output of one of O/E converters 64 that corresponds to the faulty line falls below a predetermined level and fault detector 65 determines its identity. The output of fault detector 65 is coupled to OAM controller 66. OAM controller 53 controls the selector 67 so that it sequentially selects one of its input terminals and shifts the point of selection to the next when an OAM frame is received from node A. By using the output of fault detector 65, OAM controller 66 controls the optical selector 67 so that it avoids selecting one of its inputs that corresponds to the failed transmission line. OAM controller 66 receives the OAM signal via O/E converter 68 to control the optical switch 54.

Figure 6:
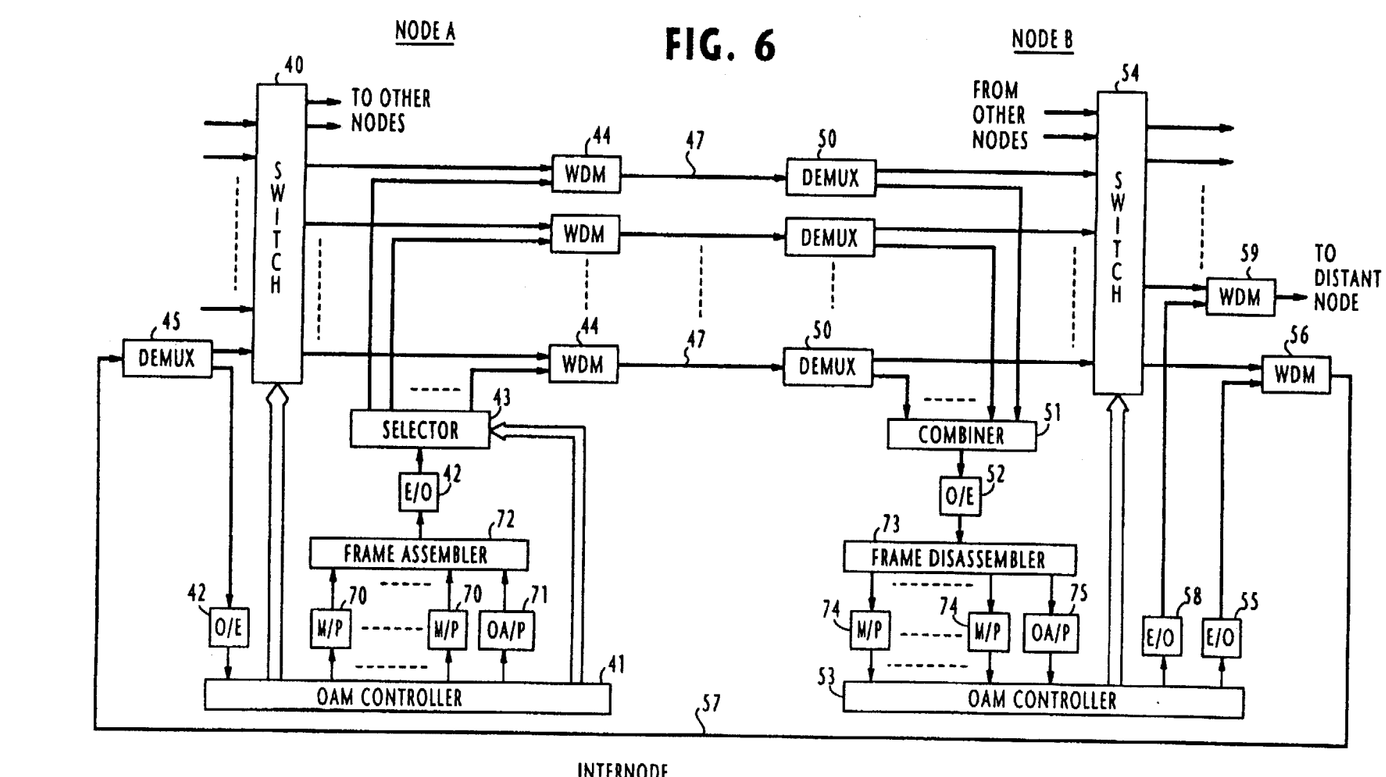
FIG. 6 is a block diagram of an optical network according to a further modification of the embodiment of FIG. 4 by incorporating a layered protocol feature.
Figure 7:
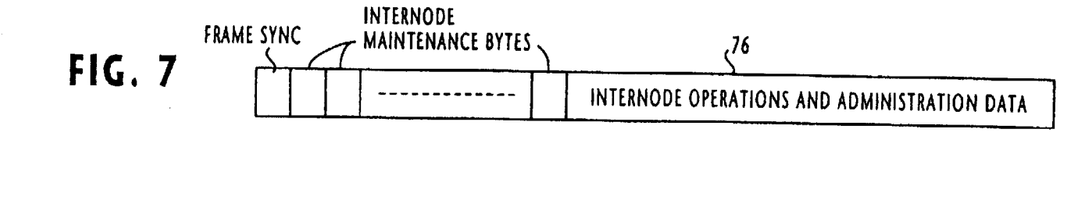
FIG. 7 shows a format of frames used in the embodiment of FIG. 6.

A further modification of the FIG. 4 embodiment is shown in FIG. 6. According to this modification, OAM signals are transmitted on two layers of OAM protocols, one for transmitting internode maintenance signals and the other for transmitting an internode operations and administration signal. As shown in FIG. 6, node A includes a plurality of maintenance processor 70 associated respectively with transmission lines 47 and an operations and administration (OA) processor 71. Each of the maintenance processors 70 produces a byte for maintenance of the associated transmission line. The processors 70 and 71 are connected to OAM controller 60 to receive necessary data therefrom to produce the internode maintenance bytes and the internode OA data. The outputs of processors 70 and 71 are connected to a frame assembler 72 where the maintenance bytes and the OA data are assembled to form an OAM frame 76 shown in FIG. 7. The output of frame assembler 72 is applied through E/O converter 42 to optical selector 43 and multiplexed in wavelength-division multiplexers 44 with optical payload signals from switch 40 and transmitted to node B. As described in connection with FIG. 4, the optical selector 43 is controlled to sequentially select its outputs and shifts to the next when an OAM frame is transmitted from one output of the selector 43.

At node B of FIG. 6, the transmitted optical multiplex signal is decomposed by a corresponding one of demultiplexers 50 into an optical OAM frame and an optical payload signal. The optical OAM frame is applied through combiner 51 to O/E converter 52 while the optical payload signal is applied to optical switch 54 in the same manner as in the FIG. 4 embodiment. A frame disassembler 73 is connected to the output of O/E converter 52 to disassemble the received OAM frame into internode maintenance bytes and OA data. Maintenance processors 74 and an OA processor 75 are connected to the outputs of frame disassembler 73 for receiving and processing the disassembled bytes and OA data. Each maintenance processor 74 analyzes the corresponding maintenance byte to produce an appropriate control signal for coupling to OAM controller 53. Since maintenance bytes are transported on a layer separated from the layer of internode operations and administration data, a quick recovery procedure can be provided at each network node in the event of a line failure.

Figure 8:
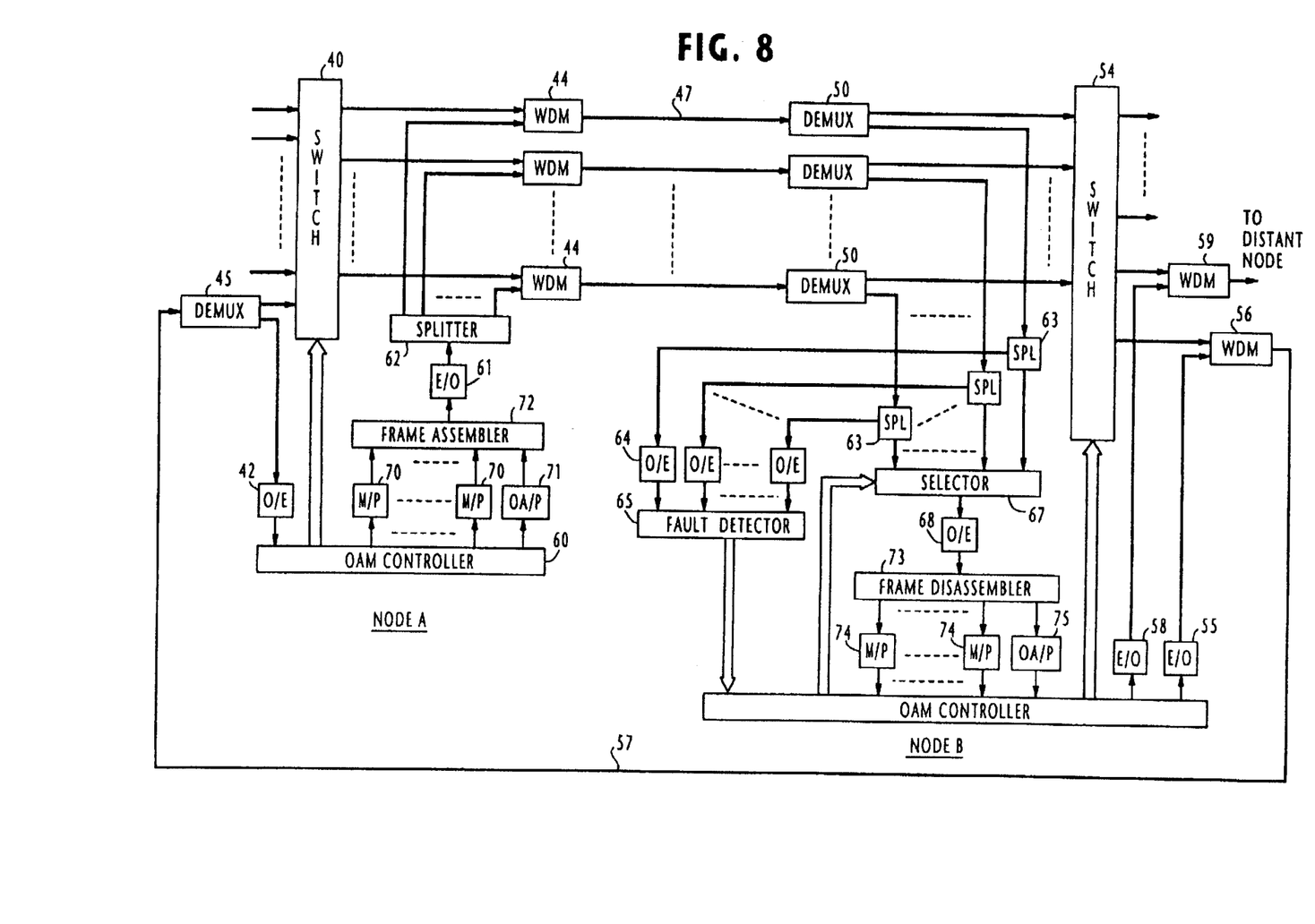
FIG. 8 is a block diagram of an optical network according to a modification of the embodiment of FIG. 5 by incorporating the layered protocol feature.

It is seen that the embodiment of FIG. 5 can also be modified to include the layered protocol feature of the present invention as shown in FIG. 8. In this modification, the maintenance processors 70 and OA processor 71 at node A are connected to the OAM controller 41 and the frame assembler 72 is connected to the input of E/O converter 61. At node B, the frame disassembler 73 is connected to the output of O/E converter 68 and the maintenance processors 74 and OA processor 75 are connected to the OAM controller 53.

Figure 9:
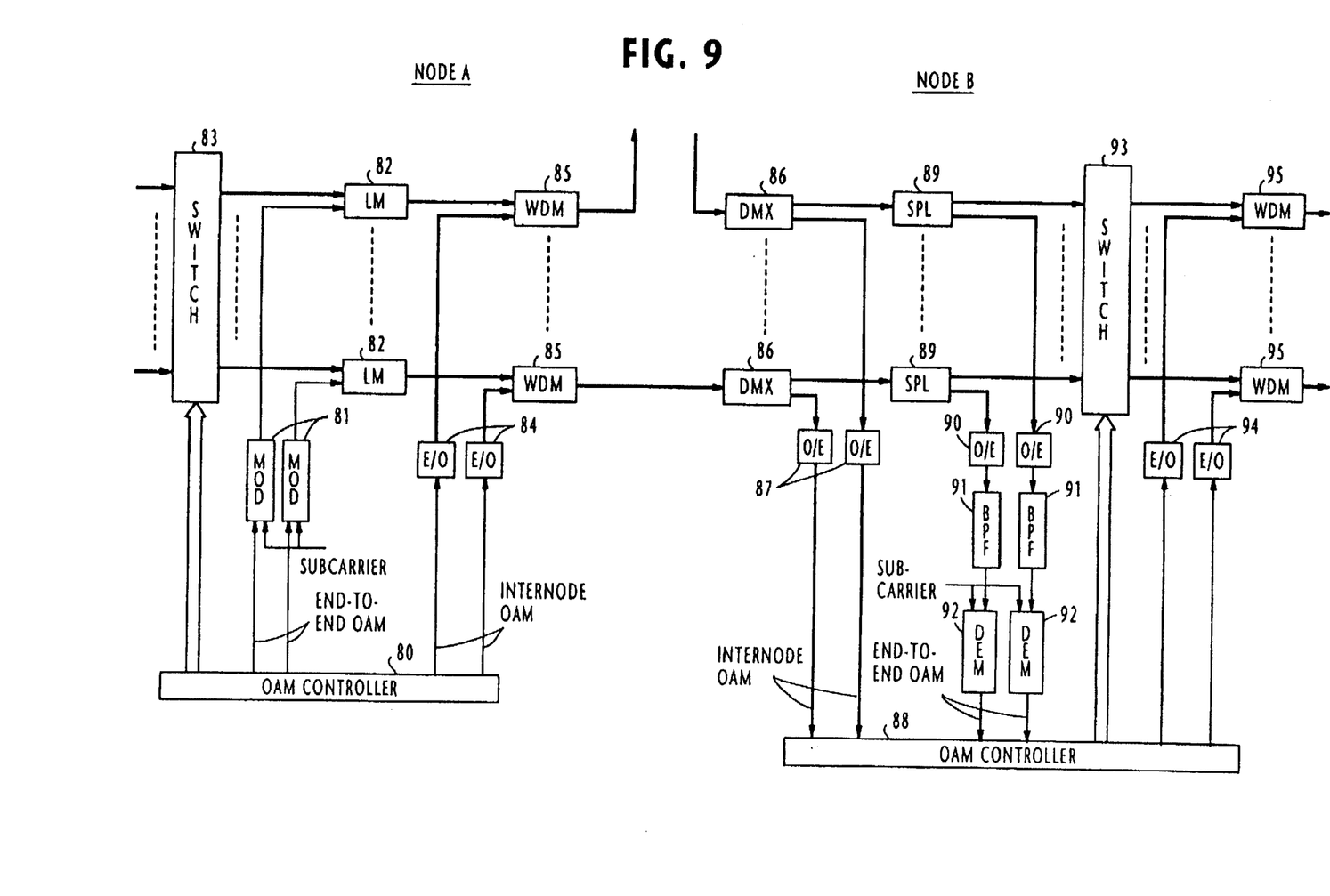
FIG. 9 is a block diagram of an optical network according to a third embodiment of the present invention.

An optical network according to another embodiment of the present invention is shown in FIG. 9 as comprising nodes A and B functioning as source and intermediate nodes, respectively. At node A, a plurality of modulators 80 are provided for modulating a subcarrier with end-to-end OAM signals supplied from OAM controller 80. Each end-to-end OAM signal contains node identifiers of all nodes connected in tandem in the same route between source and destination. Each node extracts OAM data specified by the corresponding node identifier to control its optical switch. The outputs of modulators 81 are supplied to light modulators 82, respectively, where they are modulated on optical payload signals of wavelength 1.31-µm from an optical switch 83. In each light modulator 82, the optical payload signal is amplitude-modulated with the subcarrier which is modulated with the end-to-end OAM signal with such a modulation index which does not prevent reception of the payload signal.

In addition to the end-to-end OAM signals, OAM controller 80 supplies internode OAM signals to E/O converters 84 where they are converted to 1.55-µm optical signals. The outputs of light modulators 82 and E/O converters 84 are supplied to wavelength-division multiplexers 85 where they are multiplexed for transmission to node B.

Node B of FIG. 8 has wavelength-division demultiplexers 86 for receiving the signals of the type as transmitted from node A as well as from other nodes. The internode OAM signals are separated, converted to electrical signals by O/E converters 87 and supplied to an OAM controller 88. The sub-carrier modulated optical payload signals are supplied from demultiplexers 86 to optical splitters 89 in each of which two replicas of the input signal is produced. One of these replicas is applied to an optical switch 93 and the other to one of a plurality of O/E converters 90. The outputs of O/E converters 90 are connected respectively to bandpass filters 91 for extracting the subcarrier frequency components from the baseband payload signals. The outputs of bandpass filters 91 are supplied to demodulators 92 where the baseband end-to-end OAM signals are recovered using a locally generated subcarrier. OAM controller 88 extracts OAM signals specified by the corresponding node identifier from the recovered end-to-end OAM signals. According to the internode OAM signals and the end-to-end OAM signals, OAM controller 88 controls the switch 93. Additionally, OAM controller 88 updates the internode OAM signals and supplies the updated internode OAM signals to E/O converters 94 for conversion to optical signals of the wavelength 1.55-µm. The outputs of E/O converters 94 are respectively coupled to wavelength-division demultiplexers 95 where they are multiplexed with 1.31-µm subcarrier-modulated optical payload signals from optical switch 93 for transmission to downstream nodes.

While mention has been made of various embodiments in which it is shown that the optical multiplexers are connected to the output ports of an optical switch and the optical demultiplexer are connected to the input ports of the switch, the present invention is not limited to these arrangements. The optical multiplexers could be connected to the input ports and the optical demultiplexers could be connected to the output ports, i.e., the point of multiplexing or demultiplexing could occur either at the input or output port of an optical switch. It is only necessary that the payload signal to be multiplexed with an OAM signal or demultiplexed from the OAM signal be one that is associated with one of the optical paths established in the switch.

What is claimed is:

1. An optical network having first and second nodes interconnected by an optical transmission line, wherein said first node comprises:

a first operations, administration and maintenance (OAM) controller for producing an electrical OAM signal;

a first optical switch having a plurality of input ports and a plurality of output ports for establishing optical paths therebetween according to said electrical OAM signal;

an electro-optical converter for converting said electrical OAM signal to an optical OAM signal; and an optical multiplexer for multiplexing said optical OAM signal with an optical payload signal associated with one of said optical paths established in the first optical switch to produce an optical multiplex signal and transmitting the optical multiplex signal to said second node via said optical transmission line, wherein said second node comprises:

an optical demultiplexer for demultiplexing said optical multiplex signal into an optical payload signal and an optical OAM signal;

an opto-electrical converter for converting the demultiplexed optical OAM signal to an electrical OAM signal;

a second OAM controller for updating said electrical OAM signal; and a second optical switch having a plurality of input ports and a plurality of output ports for establishing optical paths therebetween according to said updated OAM signal, the optical payload signal demultiplexed by said optical demultiplexer being associated with one of said optical paths established in the second optical switch.

2. An optical network as claimed in claim 1, wherein said second node further comprises:

an electro-optical converter for converting said updated OAM signal to an updated optical OAM signal; and an optical multiplexer for multiplexing said updated optical OAM signal with an optical payload signal associated with one of the optical paths established in said second optical switch to produce an optical mulitplex signal for transmission to a distant node.

3. An optical network as claimed in claim 1, wherein each of said first and second nodes further comprises:

means for producing a plurality of optical test signals;

a plurality of optical multiplexers for multiplexing said optical test signals respectively with a plurality of optical payload signals to produce a plurality of optical mulitplex signals and applying said optical multiplex signals to the input ports of the optical switch of each node; and a plurality of optical demultiplexers for receiving said optical multiplex signals from the output ports of the optical switch of each node and demultiplexing the received optical multiplex signals into a plurality of optical payload signals and a plurality of optical test signals and applying the demultiplexed optical test signals to said OAM controller of each node.

4. An optical network as claimed in claim 1, wherein the OAM controller of said first node includes means for producing an internode maintenance signal and an internode operations and administration (OA) signal, wherein said first node further comprises a frame assembler for assembling said internode maintenance signal and said internode OA signal to form an OAM frame and applying the OAM frame to said optical multiplexer as said optical OAM signal, and wherein said second node comprises a frame disassembler for receiving an electrical OAM frame from said opto-electrical converter as said electrical OAM signal and disassembling the received electrical OAM frame into said internode maintenance signal and said internode OA signal and applying the disassembled signals to said OAM controller of the second node.

5. An optical network as claimed in claim 1, wherein the OAM controller of said first node comprises means for producing an end-to-end OAM signal and an internode OAM signal and applying the internode OAM signal to said electro-optical converter as said electrical OAM signal to thereby supply therefrom an optical internode OAM signal to said optical multiplexer as said optical OAM signal, said first node further comprising:

a modulator for modulating a subcarrier with said end-to-end OAM signal; and a light modulator for modulating an optical payload signal associated with one of the optical paths established in said first optical switch with said modulated subcarrier and applying the modulated optical payload signal to said optical multiplexer as said optical payload signal, whereby the optical demultiplexer of the second node supplies a subcarrier-modulated optical payload signal and an optical internode OAM signal, and said opto-electrical converter supplies an electrical internode OAM signal to said OAM controller of said second node, wherein said second node comprises:
an optical splitter for splitting the subcarrier-modulated optical payload signal of said optical demultiplexer into first and second optical signals and applying the first optical signal to said second optical switch;
an opto-electrical converter for converting said second optical signal from the optical splitter to an electrical signal;
a bandpass filter for extracting said modulated subcarrier from the electrical signal of said opto-electrical converter; and
a demodulator for demodulating the extracted subcarrier to recover said end-to-end OAM signal and supplying the recovered signal to said OAM controller,
the OAM controller of the second node controlling the optical switch according to said electrical internode OAM signal from said opto-electrical converter and said end-to-end OAM signal from said demodulator.

6. An optical network having first and second nodes interconnected by optical transmission lines, wherein said first node comprises:

a first operations, administration and maintenance (OAM) controller for producing an electrical OAM signal;

a first optical switch having a plurality of input ports and a plurality of output ports for establishing optical paths therebetween according to said electrical OAM signal;

a first electro-optical converter for converting said electrical OAM signal to an optical OAM signal;

an optical selector having a plurality of output terminals, said optical selector sequentially selecting one of said output terminals and coupling said optical OAM signal from said first electro-optical converter to the selected output terminal;

a plurality of first optical multiplexers having a plurality of first input terminals connected to said first optical switch and a plurality of second input terminals connected respectively to the output terminals of said optical selector for multiplexing said optical OAM signal from one of the output terminals of the optical selector with an optical payload signal associated with one of the optical paths established in said first optical switch to produce an optical multiplex signal, said optical multiplexers being connected respectively to said transmission lines;

a first optical demultiplexer for receiving an optical multiplex signal from said second node via one of said optical transmission lines and demultiplexing the received signal into an optical payload signal and an optical control signal; and a first opto-electrical converter for converting said optical control signal to an electrical control signal;

said first OAM controller being responsive to said electrical control signal for controlling said optical selector to avoid selecting one of the output terminals thereof which corresponds to the failed transmission line.

7. An optical network as claimed in claim 6, wherein said second node comprises:

a plurality of second optical demultiplexers having a plurality of first output terminals and a plurality of second output terminals, each one of said second optical demultiplexers demultiplexing the optical multiplex signal from said first node into an optical payload signal and an optical OAM signal and coupling the optical OAM signal to a corresponding one of the second output terminals thereof;

an optical combiner for receiving said optical OAM signal through each one of the second output terminals of said second optical demultiplexers;

a second opto-electrical converter for converting the optical OAM signal from said optical combiner to an electrical OAM signal;

a second OAM controller for monitoring said electrical OAM signal to determine the identity of one of said transmission lines if said one of the transmission lines has failed, producing a control signal indicating said identity, and updating said electrical OAM signal;

a second optical switch connected to said second optical demultiplexers, said second optical switch having a plurality of input ports and a plurality of output ports for establishing optical paths therebetween according to said updated OAM signal;

a second electro-optical converter for converting said control signal to an optical control signal; and a second optical multiplexer for multiplexing an optical payload signal associated with one of the optical paths established in said second optical switch with said optical control signal to produce an optical multiplex signal and transmitting the optical multiplex signal to the first optical demultiplexer of said first node.

8. An optical network as claimed in claim 7, wherein said first node further comprises a frame assembler for assembling a plurality of internode maintenance signals respectively concerning said plurality of transmission lines and an internode operations and administration (OA) signal to form an OAM frame and applying the OAM frame to said first electro-optical converter as said electrical OAM signal, and wherein said second node further comprises a frame disassembler connected to the output of said second opto-electrical converter for receiving said OAM frame as said electrical OAM signal and disassembling the received OAM frame into said plurality of internode maintenance signals and said internode OA signal, said second OAM controller receiving the disassembled internode maintenance signals and internode OA signal for controlling said second optical switch.

9. An optical network having first and second nodes interconnected by optical transmission lines, wherein said first node comprises:

a first operations, administration and maintenance (OAM) controller for producing an electrical OAM signal;

a first optical switch having a plurality of input ports and a plurality of output ports for establishing optical paths therebetween according to said electrical OAM signal;

a first electro-optical converter for converting said electrical OAM signal to an optical OAM signal;

a first optical splitter for splitting said optical OAM signal into a plurality of optical OAM signals; and a plurality of first optical multiplexers having a plurality of first input terminals for receiving optical payload signals associated with the optical paths established in said first optical switch and a plurality of second input terminals for respectively receiving said plurality of optical OAM signals from said first optical splitter and multiplexing the received optical OAM signals with the received optical payload signals to produce a plurality of optical multiplex signals and transmitting the optical multiplex signals to said second node via said transmission lines.

10. An optical network as claimed in claim 9, wherein said second node comprises:

a plurality of first optical demultiplexers for respectively receiving said optical multiplex signals from said first node and demultiplexing the received signals into a plurality of optical payload signals and a plurality of optical OAM signals;

a plurality of second optical splitters for splitting said plurality of optical OAM signals into a plurality of first optical OAM signals and a plurality of second optical OAM signals;

a fault detector for receiving said first optical OAM signals from said second optical splitters and determining therefrom the identity of one of said transmission lines if said one of the transmission lines has failed;

an optical selector for sequentially selecting one of said second optical OAM signals from said second optical splitters;

a first opto-electrical converter for converting the second optical OAM signal selected by the optical selector into an electrical OAM signal;

a second OAM controller for controlling said optical selector according to the identity of the failed transmission line determined by the fault detector so that said optical selector avoids selecting one of the input terminals thereof which corresponds to the failed transmission line, and updating said electrical OAM signal; and a second optical switch connected to said first optical demultiplexers, said second optical switch having a plurality of input ports and a plurality of output ports for establishing optical paths therebetween according to said updated OAM signal.

11. An optical network as claimed in claim 10, wherein said second OAM controller includes means for producing an alarm signal indicating said identity of the failed transmission line;

a second electro-optical converter for converting said alarm signal to an optical alarm signal; and a second optical multiplexer for multiplexing an optical payload signal associated with one of the optical paths established in said second optical switch with said optical alarm signal to produce an optical multiplex signal and transmitting the optical multiplex signal to said first node via one of said optical transmission lines;

wherein said first node further comprises:

a second optical demultiplexer for receiving said optical multiplex signal from said second node and demultiplexing the received signal into an optical payload signal associated with one of the optical paths established in said first optical switch and an optical alarm signal; and a second opto-electrical converter for converting said optical alarm signal to an electrical alarm signal and applying the electrical alarm signal to said first OAM controller, said first OAM controller controlling said first optical switch in accordance with said electrical alarm signal.

12. An optical network as claimed in claim 10, wherein said first node further comprises a frame assembler for assembling a plurality of internode maintenance signals respectively concerning said plurality of transmission lines and an internode operations and administration (OA) signal to form an OAM frame and applying the OAM frame to said first electro-optical converter as said electrical OAM signal, and wherein said second node further comprises a frame disassembler connected to the output of said second opto-electrical converter for receiving said OAM frame as said electrical OAM signal and disassembling the received OAM frame into said plurality of internode maintenance signals and said internode OA signal, said second OAM controller receiving the disassembled internode maintenance signals and internode OA signal for controlling said second optical switch.

* * * * *